March 11, 1969 K. WINKLER 3,432,838
MAGNETICALLY DECOUPLED MAGNETIC READ-WRITE TRANSDUCER ASSEMBLY
Filed Aug. 18, 1965
Fig. 1
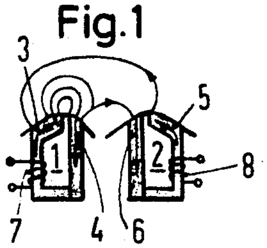
Fig. 2
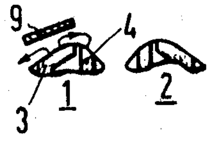
Fig. 3
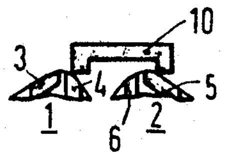
Fig. 4
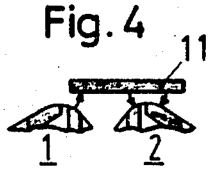
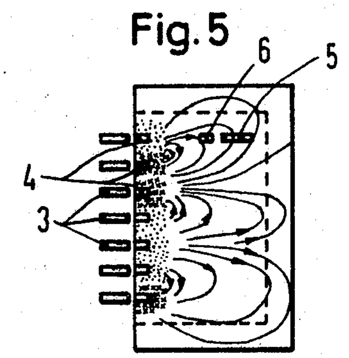
Fig. 5
Fig. 6b
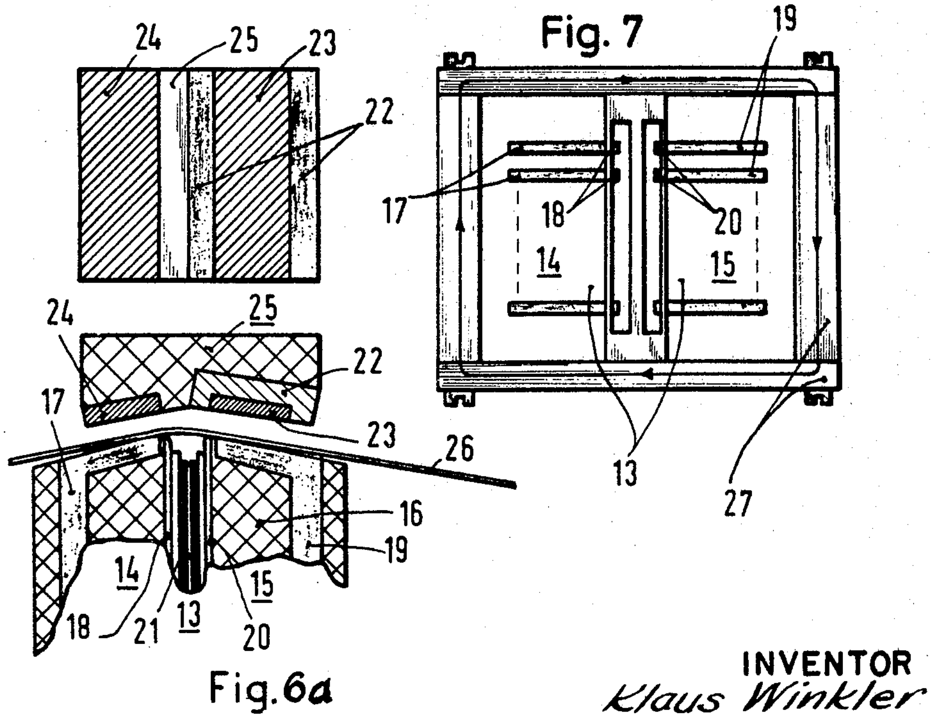
Fig. 7
Fig. 6a
INVENTOR
Klaus Winkler
BY Spiegel & Spiegel
ATTYS.

United States Patent Office 3,432,838

Patented Mar. 11, 1969

3,432,838

MAGNETICALLY DECOUPLED MAGNETIC READ-WRITE TRANSDUCER ASSEMBLY

Klaus Winkler, Planegg, Germany, assignor to Siemens Aktiengesellschaft, Munich, Germany, a corporation of Germany Filed Aug. 18, 1965, Ser. No. 480,585
U.S. Cl. 340—174.1 3 Claims
Int. Cl. G11b *5/00;* G01d *15/12*

ABSTRACT OF THE DISCLOSURE

A device for the coupling of the heads of a magnetic head system having at least one writing head and at least one reading head arranged closely behind the writing head in the direction of movement of the recording medium, the reading and writing heads each including a core of two legs with a gap between the leg ends adjacent the recording medium, a magnetically homogeneous and magnetically well-conducting body disposed on the side of the part of the writing and reading heads adjacent the recording medium, the body being electrically poorly conducting, whereby the body couples the legs of the writing head and reading head, and the body thereby providing a coupling between the heads having a magnetic resistance which results in a flux that is sufficiently great to compensate for the stray flux.

The invention relates to a magnetic head system comprising at least one writing head, and at least one reading head, each reading head arranged closely behind the associated writing head in the direction of movement of the recording medium.

In storage devices operating with a movable magnetizable medium, particularly in the case of magnetic tape instruments for digital data storage, it is desirable that a monitoring of the recorded data be effected immediately after the recording process. For this reason, reading heads for each recording track are frequently arranged as closely as physically possible behind the corresponding writing heads.

However, the electrical and magnetic fields of the writing heads often have an undesirable effect on the reading heads. How critical this effect is becomes clear if it is recognized that the writing signals, in general, appear with good approximation, as rectangular pulses while the signals stored on the recording medium have lost their shape.

The induced current in the reading head is proportional to the flux change per unit of time which occurs in its cores. The flux change even with small flux values can, with a steep slope, assume considerable values. Thus, it is apparent that the signals induced by the writing head directly in the reading head can assume like or even greater values than those induced by the recording medium in the reading head. This is particularly true if in the course of reading, lower velocities of the recording medium are employed, as are presently common.

It was heretofore attempted to solve this problem by use of shielding of all kinds as well as field displacement by means of electrical conductors utilizing eddy current formation, and in individual cases also by electrical compensation circuits. All these measures lead, in individual cases, to considerable improvements, especially if it is a matter of a single pair of reading and writing heads. These solutions are no longer satisfactory, however, especially when a plurality of pairs of such magnetic heads are arranged next to one another as in the case of individual tracks of a recording medium. Thus, for example, it is hardly possible with an electrical compensation circuit to take into account the difficulties encountered, because of the number and the position of the writing heads simultaneously energized. Nor can magnetic compensation methods produce the desired result for similar reasons. Such a magnetic compensation method is known, for example from German Patent No. 1,047,466, which is directed to the decoupling of adjacent magnetic heads of a multi-track magnetic tape apparatus. Shielding is of course effective only to a certain degree, and further, the use of shielding is limited since the recording medium, after all, must move. Further, most of the shielding elements heretofore used are decidedly critical in adjustment; that is, the achievement of their best possible adjustment is at least time consuming. Also, even slight alterations or displacements of the shielding means, such as may occur, for example, through jolting, heat expansion or wear, jeopardize the desired results.

According to the invention, however, a very extensive decoupling of the reading and writing heads may now be achieved, with extremely non-critical adjustment, by an arrangement in which a common magnetically homogeneous and magnetically good-conducting but electrically poor-conducting body is coupled in each case to the leg of each writing head core facing the reading head. This body is also coupled to the leg of each reading head, both facing the writing head and also remote from the writing head. The body has just sufficient magnetic resistance that there arises therein a resulting flux which is just great enough to compensate for the stray flux in the reading head core; moreover, through the use or lack of use of adjacent electrical conductors, the time lag due to eddy currents in the stray field in the magnetically good-conducting body is insofar as possible equal.

According to the invention, therefore, use is made of compensation by magnetic means. It must be kept in mind, however, that the magnetically good-conducting body bringing about the magnetic compensation is common to all adjacently arranged writing and reading heads. Also, in consequence of such body facing both the writing head as well as the leg of the reading head core which is remote from the writing head, it transfers magnetic flux in both directions to the reading head core and accordingly only the differential flux is responsible for the compensation of the stray flux in the reading head core. Through the relatively loose coupling of the magnetic conductor to the cores of the reading and writing heads there is achieved, according to the invention, non-critical disposition of the coupling means. Since the magnetic conductor utilized is magnetically homogenenous, and since it can be assumed that as a result of the high permeability transition the magnetic flux enters approximately perpendicularly, it can be inferred that the magnetic field distribution in the magnetic conductors is approximately the same as in the magnetically neutral and homogeneous space surrounding the writing as well as the reading heads. Since the compensation flux behaves in the same manner as the stray flux, it is inconsequential according to the invention as to how many and which ones of the writing heads are instantaneously energized in one or the other direction.

The compensation effect, of course, can occur satisfactorily only when no appreciable reciprocal phase displacement in the reading head cores takes place between the compensation flux and the magnetic flux. Phase displacements are created in such case by eddy currents, such as are induced in adjacent electrical conductors through the variable magnetic flux of the writing head cores. Such electrical conductors thereby present inductances, which in a known manner cause a time lag. Certain eddy current formations will always occur, for example, in the magnetic head cores themselves. Furthermore, magnetic conductors frequently likewise have electrical conductor properties as, for example, those of the well known Mumetal. A good magnetic conductor with relatively poor electrical conductor properties, however, is obtained from a ferrite material. With a magnetic conductor made of ferrite coupled to the cores of the reading as well as of the writing heads, it is possible to achieve extremely low time lags in the magnetic flux. Also as a material for the shielding means ferrite offers in certain cases advantages over Mumetal. According to the invention, however, too extensive an elimination of the time lag of the magnetic flux is not desired. This is so since with excessively steep and narrow impulses the compensation of the magnetic flux evoked through the magnetic stray flux in the reading head cores is very critical in view of the requirement for like phasing. If with extremely sharp magnetic impulses the compensation flux should be delayed by only a slight amount with respect to the stray flux, then not only the compensation of the magnetic flux present in the reading head cores would drop out, but now in addition, there would occur just as great a magnetic flux in the reverse direction. Through lags and attenuations of the magnetic flux, in consequence of the formation of eddy currents, not only are the original sharp impulses flattened but also expanded in such a way that no strict requirements now have to be placed on simultaneity. For this reason, in a preferred example of construction of the invention, as is hereafter described in detail with the aid of figures, electrical conductors are provided in order to attenuate and to correspondingly delay the magnetic impulses. Furthermore, use is made of an electrical conductor for the field displacement.

In the drawings, wherein like reference characters indicate like or corresponding parts:

FIG. 1 illustrates the field course occurring around a writing head core in the absence of any shielding means;

FIG. 2 illustrates the effect of a magnetic field displacement as it is effected by an electrical conductor in the presence of variable magnetic flux;

FIG. 3 illustrates a possibility for compensating for the magnetic flux evoked in a certain direction in the reading head core by the stray flux, in which such a flux is in opposite direction;

FIG. 4 illustrates the principle according to the invention of the loose coupling of a magnetic conductor to the magnetic head cores, in which arrangement in the reading head core per se two sets of flux are transmitted in opposite directions;

FIG. 5 illustrates the field distribution in a magnetically homogeneous magnetic conductor coupled to adjacently arranged writing head cores;

FIG. 6*a* is a section illustrating a preferred example of the invention, in which use is made both of the effect of compensation as well as that of field displacement;

FIG. 6*b* is a bottom view of the block 25 illustrated in FIG. 6*a*; and

FIG. 7 illustrates the mounting of a magnetic head system formed of a number of writing and reading heads in an electrical conductor and the current course which exists in this conductor.

In FIG. 1 there are indicated two successively arranged magnetic heads 1 and 2, the respective cores of which comprise a "C core" 3 or 5 and an "I core" 4 or 6 (so-called because of their form), which closely abut one another on one side, but on the other, namely the side facing the recording medium, they define an air gap. The C core 3 of the left hand magnetic head carries the writing winding 7, while the C core 5 of the right hand magnetic head carries the reading winding 8. There is further illustrated in FIG. 1 the course of the magnetic field as it will develop about the air gap of the reading head 1. It will be further noted that a part of the stray flux will permeate the core 6, 5 of the reading head 2, the field course there represented generally corresponding to that which can be expected in the absence of any shielding or compensation means.

In FIG. 2 there is again indicated at the left side a writing head 1 and at the right side a reading head 2. There is additionally represented, however, above the C core 3 of the writing head 1 a flat electrical conductor 9, of plate-like construction, under the influence of which, as indicated, the flux emanating from the C core 3 in the proximity of the air gap is so displaced that at least the lines of force closing over the core 6, 5 of the reading head 2 are conducted in the shortest path to the I core 4 of the writing head.

In FIG. 3, with conditions otherwise remaining the same, there is indicated the possibility of compensation of the magnetic flux coming from the stray field in the core of the reading head 2. As is apparent from FIG. 1, a part of the magnetic stray flux emanating from the I core 4 of the writing head 1 normally permeates the core of the reading head 2 in the direction from I core 6 to C core 5, in order to be closed over the C core 3 of the writing head 1. The remaining head core is therefore permeated counterclockwise by this flux. Through the magnetic conductor 10, illustrated in FIG. 3, which is magnetically coupled with the I core 4 of the writing head 1 as well as with the C core 5 of the reading head 2, a part of the magnetic flux emanating from the I core 4 of the writing head 1 is conducted to the C core 5 of the reading head 2, so that it permeates the latter, as well as the contiguous I core 6, in opposite direction, namely, clockwise. If it is assumed that both sets of flux have no time lag, or in any event only an unappreciable time lag with respect to one another, the compensation may be achieved by varying the coupling of the magnetic conductor 10 with respect to the I core 4 and the C core 5. It will be apparent that in a narrow magnetic coupling such as appears in the arrangement represented, the exact positioning of the magnetic conductor 10 with respect to the two magnetic heads 1 and 2 will play a considerable role.

If, however, instead of the bow-like magnetic conductor 10, a plate-like, homogeneous magnetic conductor 11 is utilized, as represented in FIG. 4, which, moreover, is arranged at some distance from the leg ends defining the air gaps of the respective cores of writing head 1 and of reading head 2, it will be apparent that the magnetic coupling resistances in this case will be much greater. In addition, there will also exist a magnetic coupling between the magnetic conductor 11 and the I-core 6 of the reading head 2, with comparable magnetic resistance. In this case, therefore, the core of the reading head 2 may be considered as permeated, in addition to a part of the stray flux, by two sets of magnetic flux which are opposite. Thus, merely the differential flux of the two sets of flux which are transmitted by means of the magnetic conductor 11 to the core of the reading head 2 is operative as a compensation flux.

The flux opposed to that which results from the stray flux, which may also be designated as a feedback flux, as a result of the greater surface of the C-core 5 adjacent the magnetic conductor 11, in comparison to the corresponding surface of the I-core 6. This is so also in view of the disposition of the winding 8 on the C-core 5 which produces the desired compensation with a nearly horizontal position of the plate-like magnetic conductor 11. In the loose coupling of the two magnetic heads 1 and 2, the effect of a horizontal displacement of the magnetic conductor 11 also is much less than would be expected in the case of a horizontal displacement of the bow-shaped conductor 10 according to FIG. 3. Thus, in an experimental arrangement with a plate-like magnetic conductor according to FIG. 4 there could be achieved an over compensation of only about 30% of the original interference voltage as compared to an over compensation of 150% of the original interference voltage with the use of a bow-shaped conductor according to FIG. 3.

In FIG. 5 there are represented at the left seven adjacently arranged writing head cores, consisting of C-cores 3 and I-cores 4, and to the right opposite to the first writing head core, there is indicated one of the reading head cores, comprising a C-core 5 and an I-core 6. If the path of a line of force in a clockwise direction is labeled as positive and a counterclockwise one as negative, then in the case represented the first, third, fourth and fifth writing head cores (as viewed from above) are energized in a positive sense, and the others in a negative sense. In such excitation, both in the air space surrounding the cores and also in the plate-like magnetic conductor 11, illustrated in FIG. 4, the represented path of the lines of force is to be assumed. It accordingly becomes apparent that with a large number of adjacently arranged writing or reading heads there also exists the possibility of compensation in the same manner as previously explained with respect to FIG. 4 in connection with a single pair of heads 1 and 2.

FIGS. 6*a* and 6*b* illustrate a tried and proven form of construction embodying the invention. FIG. 6*a* shows a longitudinal section through a multiple magnetic head 13 having a large number of adjacently arranged writing heads 14 and reading heads 15 arranged closely therebehind in the direction of movement of the recording medium 126. The heads 13 and 14 are with reference to themselves likewise arranged adjacently, which are encased in a block of an electrically as well as magnetically non-conductive material 16. In this block the C-cores 17 and the I-cores 18 of the writing heads 14 are disposed at the left, while at the right are disposed C-cores 19 and I-cores 20 of the reading heads 15. Between the writing heads 14 and the reading heads 15, or more strictly speaking, between the I-cores 18 and 20, there is arranged a shielding member 21, consisting of copper and Mumetal laminations. Above the magnetic head system 13 is an arrangement having decoupling means according to the invention. A ferrite plate 22 with a copper conductor 23 set in its underside (on the right side of the figure) and a copper plate 24 (on the left side of the figure) are mounted, in spaced relation with respect to one another, in a block 25 of a material which is electrically and magnetically non-conductive. Corresponding to the rooflike slope of the upper side of the multiple magnetic head 21, the decoupling block 25 is constructed with such an angularity that the plate-like copper conductor 24 at the side of the writing heads 14 and the magnetic conductor 22 with the inserted electrical conductor 23 at the side of the reading heads 15, extend approximately parallel to the magnetic tape 26 which is carried over the heads. The space present between the multiple magnetic head 21 and the decoupling block 25 can in each case be given such dimensions that the magnetic tape 26 can pass through unhampered. In order to facilitate the insertion of a magnetic tape 26 it may be expedient to make the decoupling block 25 so that it may be lifted or hinged.

FIG. 6*b* illustrates the bottom of the decoupling block 25 from which it will be apparent that both the magnetic conductor 22 and also the electrical conductors 23 and 24 extend, without subdivision, over the entire width of the decoupling block 25.

While the magnetic conductor 22 provides the magnetic compensation in the manner illustrated in FIG. 4, the electrical conductor 24 achieves a field displacement in the manner illustrated in FIG. 2. Furthermore, the conductor 24, as well as the conductor 23 and the electrically conducting parts of the shield 21, serve the purpose of reducing the slope of the magnetic writing impulses which, in themselves, are steep, and to provide the flux permeating the core of the reading heads 15 with equal time lags, so that compensation is possible. For this reason, in the example illustrated in the shield 21, instead of an electrically neutral, magnetically conducting material such as, for example, ferrite, Mumetal has been selected. The latter, being electrically conducting, makes possible the formation of an electric eddy field. Measures which have proved to be advantageous in the embodiment illustrated, with reference to complete decoupling of the magnetic heads, consist in a shortening of the shield 21 in such a way that it does not extend up to the recording medium 26.

Moreover, care must be taken that there does not develop an eddy current flux, as illustrated in the example of FIG. 7, in an electrically conducting frame 27 surrounding the magnetic head system 13, which can be explained by a coupling of the writing head C-cores 17 which is greater in relation to that of the I-cores 18, since such an eddy current would induce signals in the reading heads in a reverse manner.

Because of the greater number of different magnetic heads which may be used, there cannot be given any generally applicable dimensional data. However, it will not be difficult for those skilled in the art to make the necessary adaptations within the scope of the invention. Under some circumstances it may be desirable to distribute the decoupling means, as they are arranged in a block 25 according to FIG. 6*a*, at the same side of the recording carrier as the magnetic head system 13 proper is itself arranged. Such construction is particularly applicable when recording carriers of varied form, such as for example, records or drums, are utilized.

I claim as my invention:

1. In an arrangement for the decoupling of the heads of a magnetic recording system having at least one writing head and at least one reading head arranged closely behind the writing head in the direction of movement of the recording medium, each head having a separate core constructed to provide two legs having a gap between the leg ends adjacent the recording medium, the combination of a body which is magnetically homogeneous and magnetically well-conducting, but electrically poorly conducting, said body being common to and including means coupling only the leg of the writing head adjacent to the reading head, with both the leg adjacent to and the leg remote from the writing head, of the reading head, such coupling having magnetic resistances which result in a flux which is sufficiently great to compensate for stray flux.

2. A magnetic head according to claim 1 wherein at least one electrical conductor is disposed in the flux path between at least a pair of respective core legs, whereby the time lag resulting from the formation of eddy currents in the respective sets of magnetic flux of the stray field by the writing impulses and in the magnetically well-conducting body are substantially equal.

3. A magnetic head system according to claim 2, wherein said at least one electrical conductor is embedded in said magnetically well-conducting body.

References Cited

UNITED STATES PATENTS

| | | | |
|---|---|---|---|
| 2,969,529 | 1/1961 | Gilson | 179—100.2 |
| 2,926,220 | 2/1960 | Camras | 179—100.2 |
| 3,252,153 | 5/1966 | Mos | 346—74 |
| 3,249,928 | 5/1966 | Curtis et al. | 179—100.2 |
| 3,064,333 | 11/1962 | Kristiansen et al. | 179—100.2 |
| 2,981,805 | 4/1961 | Conly | 179—100.2 |
| 3,357,005 | 12/1967 | Geurst et al. | 340—174.1 |

BERNARD KONICK, *Primary Examiner*

A. I. NEUSTADT, *Assistant Examiner.*

U.S. Cl. X.R.

179—100.2; 346—74